Sept. 22, 1953 J. H. GUYTON 2,653,225
SIGNAL ACTUATED TUNER CONTROL
Filed July 22, 1949
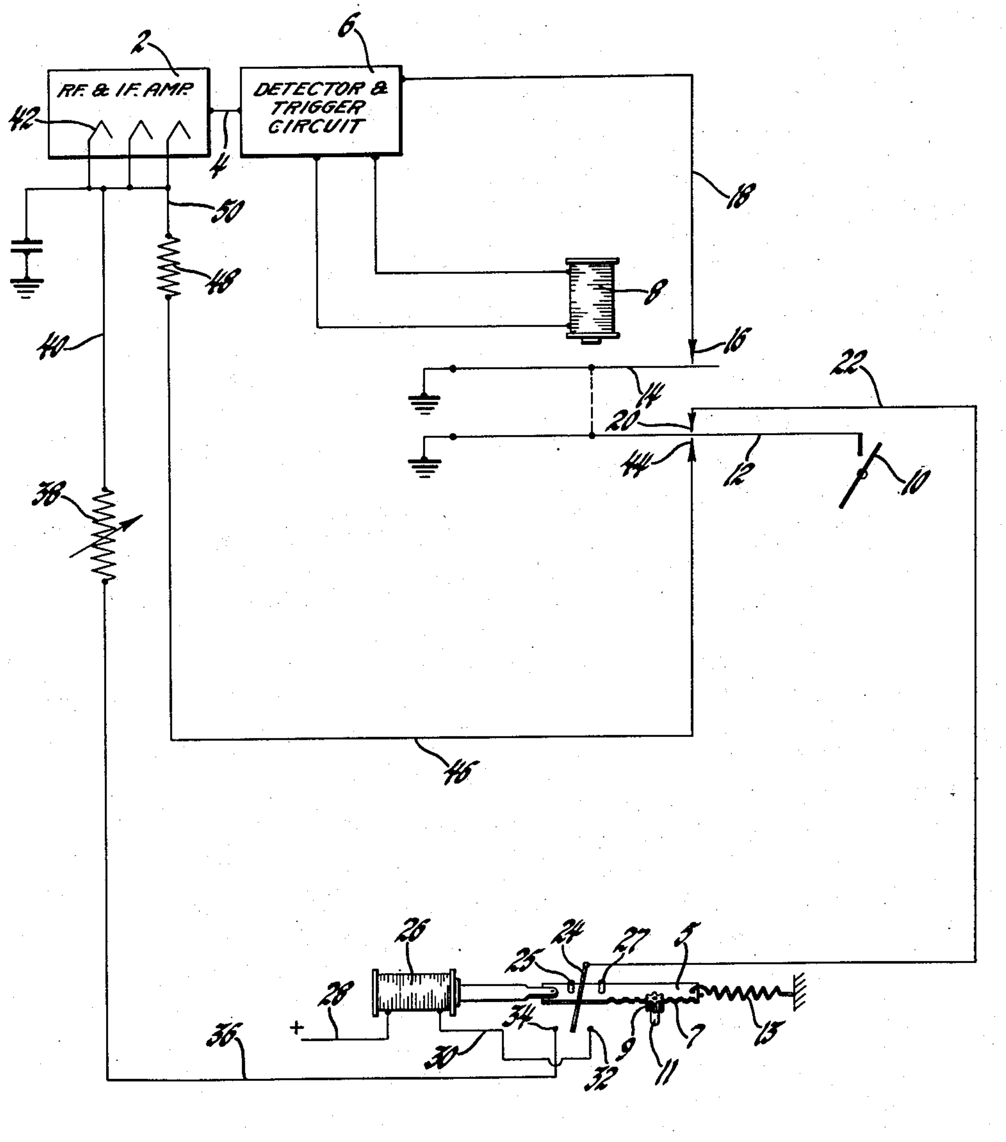
Inventor
James H. Guyton
By
Spencer, Willits, Helwig & Baillio
Attorneys Patented Sept. 22, 1953 2,653,225

UNITED STATES PATENT OFFICE 2,653,225

SIGNAL ACTUATED TUNER CONTROL

James H. Guyton, Kokomo, Ind., assignor to General Motors Corporation, Detroit, Mich., a corporation of Delaware Application July 22, 1949, Serial No. 106,224

12 Claims. (Cl. 250—20)

This invention relates to automatic tuning means for radio receiving apparatus and more specifically to that type of tuning means which is referred to as signal actuated tuning means. In all of the types of signal actuated equipment some means is provided for scanning the frequency band of the receiver, either by a small electric motor which drives the variable tuning means or by some other force-applying mechanism to cause the tuner to slowly scan the band. It is also usual to utilize for signal reception such scanning in one direction only and during the scanning if an incoming signal is picked up, that signal, through certain apparatus, operates a relay to cause the scanning means to stop and the set will then be in tune on that station. In tuners of this type in which the signal seeking scanning occurs in one direction only, the return to the opposite end of the spectrum occurs much more rapidly so that the tuner can again repeat the scanning action as desired, and during this recovery or drive back to the initial point, it is, of course, undesirable to have the signal actuated pulse attempt to stop the tuner on the back travel.

It is, therefore, an object of my invention to provide means for squelching any control signal which might tend to operate the indexing means upon travel of a scanning tuner in one direction.

It is a still further object of my invention to provide means for deenergizing a portion of the receiver circuit during back-travel of scanning tuner means.

It is a still further object of my invention to provide switching means operated by the return movement of the driving means to cause deenergization of the radio frequency portion of the receiver so that no signal will be applied to the detector portion of the receiver.

With these and other objects in view which will become apparent as the specification proceeds, my invention will be best understood by reference to the following specification and claims and the illustrations in the accompanying drawing, in which:

The figure is a schematic wiring diagram showing the essential features of my invention.

The wiring diagram shown in the figure has been simplified as much as possible in order to set forth the invention without undue reference to more complicated portions of the system whose action alone would not be affected by the present invention. There is shown at 2 a block diagram representing the R. F. and I. F. amplifiers of a conventional radio receiver with only the tube filaments shown whose output is connected through line 4 to a second block diagram 6 which represents the detector circuit of a conventional receiver and also a trigger circuit whose output would actuate a control relay 8 to index or cause the driven tuning means to stop upon the reception of a sufficiently strong incoming signal. The details of the trigger circuit are not here involved, but one type of trigger circuit that may be used is disclosed in a co-pending application, S. N. 183,069, filed September 2, 1950, in the names of Bertram A. Schwarz and Manfred G. Wright, assigned to a common assignee, which is a continuation-in-part of S. N. 63,152, filed December 2, 1948, now abandoned.

One of the driving means which has been used is a spring loaded gear drive which drives the tuning means in one direction. When it reaches the limit in that given direction, it throws a switch to energize a solenoid which, upon energization, cocks the spring by pulling the means in the opposite direction. When the solenoid has pulled the means to its limit, the switch is then thrown back to its original position and the spring again resumes the driving of the tuner over the band. This is shown diagrammatically at the lower right hand side of the figure where reciprocating movement of the bar 5 through rack teeth 7 rotates gear 9 on shaft 11 connected to the tuning means (not shown). The movement of the bar from one limit to the other covers the complete band desired. The spring 13 drives it in one direction and the solenoid 26 in the opposite direction quickly to recock the spring. This type of solenoid spring drive is fully described in said co-pending application S. N. 183,069.

An air governor is used on the drive shaft for this spring solenoid tuner and this air governor also acts as a locking brake to stop the same when an incoming signal is received. This air governor is diagrammatically shown at 10 in the drawing and a pivoted latch 12 is adapted to be moved into and out of engagement with the governor by energization of the control solenoid 8. A second movable armature 14 is connected to 12 and moves therewith for switching purposes. Stationary switch contact 16 is connected through line 18 back to the detector 6 for disabling the detector while the tuner is scanning. Both armatures 12 and 14 are grounded. A stationary contact 20 located above the armature 12 is connected through line 22 to a two-position switch 24, which is the one previously referred to as the limit switch which is thrown back and forth by travel of the tuner, but remains in its last forced position until moved in the return direction.

A line 28 extending to the positive side of the 6 volt battery is connected to one terminal of the solenoid 26, the opposite terminal being connected through line 30 to stationary contact 32, which cooperates with the movable switch arm 24. A second stationary contact 34 also cooperating with switch arm 24 is connected through line 36 to one side of a variable resistor 38, the opposite side of which is connected through line 40 to the filaments 42 of the amplifier tubes in the R. F. and I. F. amplifiers. The opposite side of the filaments is supplied by suitable power from a source (not shown). A second stationary contact 44 mounted below and cooperating with armature 12 is connected through line 46 to one terminal of a resistor 48, the other terminal of which is connected through line 50 to the filaments 42. For the majority of the time that the device is either tuning or in use, switch arm 24 remains in contact with stationary contact 34, and is only swung over to engage contact 32 long enough to energize the solenoid, which immediately recocks the spring in a very short time period, and this immediately returns the switch arm 24 to contact 34. Therefore, we can assume that for the majority of the time of operation arm 24 completes the circuit at 34.

Assuming that the set is being manually tuned and, therefore, the automatic equipment is deenergized, armature 12 is in its lowermost position and engages contact 44 to complete an obvious circuit from the filaments through the resistor 48, line 46, contact 44, armature 12 to ground. In this manner the value of the resistor 48 in this circuit will determine the sensitivity of the amplifier by causing a fixed grid bias due to plate current on the R. F. and I. F. amplifiers which receive power from means not shown. It might also be noted that at this same time the end of the armature 12 engages the governor 10 to prevent any motion of the motor driven means. Whether the manual tuning means is operated to such an extent that it throws the switch 24 back and forth between stationary contact points 32 and 34 is immaterial, as that circuit is open at contact 20 and nothing will happen. Therefore, during manual tuning, the sensitivity of the receiver is determined by and controlled by resistor 48.

If the automatic tuning means is now placed in operation and relay 8 energized, it picks up armatures 12 and 14, releases the governor 10 and the spring drive causes the tuner to slowly scan the band. At the same time contact 16 is engaged by armature 14 to ground line 18 and the detector is disabled. Simultaneously armature 12 engages upper contact 20 to connect line 22 to ground and since the switch arm 24 is usually in the left hand position, a circuit is completed from the filaments 42, through line 40, variable resistor 38, line 36, stationary contact 34, movable arm 24, line 22, stationary contact 20, and armature 12 to ground. Therefore, while the tuner means is scanning the band, the sensitivity of the set is determined by the setting on the variable resistor 38, which is probably different from the sensitivity of the receiver on manual tuning, but may be at any desired value. When the spring motor has driven the tuning means to the limit of movement, the carriage pin 25 engages arm 24 to swing it over to break with stationary contact 34 and make with contact 32. This closes an obvious circuit from the 6 volt battery through line 28, solenoid 26, line 30, contact 32, arm 24, line 22, stationary contact 20 and armature 12 to ground, and thus energizes the cocking relay 26, which immediately forces the carriage in the opposite direction, leaving, however, arm 24 in engagement with 32 until it reaches the opposite end of its travel.

During this period it is desirable to deenergize the amplifier so that no incoming signal will tend to stop the tuner and this is accomplished by opening line 36 completely, which breaks the filament ground return circuit and, therefore, accomplishes the desired result. The other filament circuit through resistor 48 is always open at 44 during scanning tuning. The amplifier is, therefore, deenergized and no signal pulse will be transmitted through to the detector. Upon the carriage reaching its other limit to completely cock the spring, arm 24 is engaged by pin 27 and thrown back into its original position in engagement with contact 34, at which time the solenoid circuit 26 is opened and the tuner begins to again scan over the band with the sensitivity determined by the setting on resistor 38. When a signal of sufficient strength is received relay 8 will be deenergized, dropping its armatures 12 and 14, locking governor 10 against any further movement and the set is now in tune. During any return or cocking travel of the carriage, however, it will be obvious that the filament circuits are opened and the amplifier deenergized to prevent any tendency to stop on signal.

I claim:

1. In radio receiving means having amplifying means, detector means and power actuated means for repetitively scanning the frequency spectrum between prescribed limits for incoming signals, a limit switch connected to ground and to the amplifying means to complete the circuit therefor, said switch having a movable arm, means for mounting said switch arm adjacent the power actuated means, means on the power actuated means engaging said switch arm in different positions of the power actuated means, said engagement moving said switch arm to a plurality of positions by movement of the power actuated means to extreme positions to open said switch at one extremity of travel and deenergize the amplifier during travel of the power actuated means in one direction.

2. In radio receiving means having a radio frequency amplifier section, a detector section and power actuated tuning means for scanning the frequency spectrum between prescribed limits, switching means in the energizing circuit for the amplifier section, said switch means having a movable arm means for mounting said switch arm adjacent the power actuated means, means on the power actuated means engaging said switch arm in different positions of the power actuated means, said engagement moving said switch arm to actuate the switching means and deenergize the amplifier during part of the movement of the tuning means.

3. In radio receiving means having amplifying means, detecting means and power actuated tuning means for repetitively scanning the frequency spectrum between prescribed limits for incoming signals, a limit switch having a movable arm mounted adjacent the power actuated scanning means, means on the power actuated means engaging said switch arm in different positions of the power actuated means, said engagement moving said switch arm in opposite directions when said power actuated means moves to its extreme positions and conductive means interconnecting said switch in the energizing circuit of the amplifying means so that during one direction of travel of the tuning means the amplifier will be energized and during the opposite travel deenergized.

4. In radio receiving means having amplifying means, detecting and trigger circuit means and power actuated tuning means for repetitively scanning the frequency spectrum between prescribed limits, a relay coil connected to the detector and trigger circuit means and controlled thereby, a first switching means connected in the energizing circuit for the amplifier means operated by the coil, a second switching means connected in the energizing circuit for the amplifier means in parallel with the first and mounted in the path of the power actuated tuning means to be actuated by movement thereof, both said switching means controlling the energization of said amplifier means.

5. In radio receiving means having amplifying means, detecting and trigger circuit means and power actuated tuning means for repetitively scanning the frequency spectrum between prescribed limits, a relay coil connected to the detector and trigger circuit means and controlled thereby, armature means actuated by said coil and electrically grounded, a pair of spaced contacts alternatively engageable by said armature, a movable switch arm mounted in the path of the power actuated tuning means and actuated by movement thereof conductively connected to one of the spaced contacts engageable by said armature, a stationary contact cooperating with said switch arm and conductively connected in the energizing circuit for the amplifier, and a second conductive line connected in the energizing circuit for the amplifier and to the second spaced contact so that when the relay is energized to move its armature in contact with the first spaced contact the amplifier energization will be controlled by the travel of the tuner through the switch, but when the receiver is in tune and the relay coil deenergized then the amplifier energization will be controlled through the second spaced contact and the armature.

6. In radio receiving means having amplifying means, detecting and trigger circuit means and power actuated tuning means for repetitively scanning the frequency spectrum between prescribed limits, a relay coil connected to the detector and trigger circuit means and controlled thereby, armature means actuated by said coil and electrically grounded, a pair of spaced contacts alternatively engageable by said armature, a movable switch arm mounted in the path of the power actuated tuning means and actuated by movement thereof conductively connected to one of the spaced contacts engageable by said armature, a stationary contact cooperating with said switch arm, a variable resistor connected to said last named contact and to the energizing circuit for the amplifier, and a second resistor connected to the energizing circuit for the amplifier and to the second spaced contact so that when the switch is closed the sensitivity of the amplifier is determined by the adjustment of the variable resistance while the tuning means is operating over a portion of its travel but the amplifier will be deenergized by opening of the switch on reverse travel, said second resistor determining the sensitivity of the amplifier when the tuner is inoperative and the relay coil deenergized.

7. In radio receiving means having amplifying means, detecting and triggering means and power actuated tuning means for repetitively scanning the frequency spectrum between prescribed limits, a relay coil connected to the detector and trigger means and controlled thereby, armature means actuated by said coil and electrically grounded, a contact engageable by said armature in its energized position, a movable switch arm mounted in the path of the power actuated means and activated by movement thereof conductively connected to the contact engageable by the armature, a source of power connected to a portion of said power actuated means and a stationary contact connected to said portion of the power actuated means and engageable by said movable switch arm to complete the circuit to said portion of the actuated means only when the relay coil is energized.

8. In radio receiving means having amplifying means, detecting and triggering means and power actuated tuning means for repetitively scanning the frequency spectrum between prescribed limits, a relay coil connected to the detector and trigger means and controlled thereby, armature means actuated by said coil and electrically grounded, a contact engageable by said armature in its energized position, a movable switch arm mounted in the path of the power actuated means and actuated by movement thereof conductively connected to the contact engageable by the armature, a source of power connected to a portion of said power actuated means, a pair of spaced stationary contacts engageable by the movable switch arm, conductive means for connecting one of these contacts to a portion of the power actuated means, conductive means connected to the second spaced contact engageable by the movable switch arm, variable impedance means connected to the last named conductive means and to the amplifying means so that when the relay coil is energized, the power actuated means may switch the movable switch arm from a completion of the circuit through the variable impedance to the amplifier to change the amplification thereof to a completion of the circuit for a portion of the power actuated means itself.

9. In radio receiving means having amplifying means, detector means and power actuated means for repetitively scanning the frequency spectrum between prescribed limits for incoming signals, switching means for controlling the power actuated means, relay means operating the switching means, and separate means for biasing the amplifying means to different degrees of sensitivity each connected in a separate circuit with the switching means to be alternately included dependent upon switch position so that the sensitivity of the amplifier will be different for the different switch positions.

10. In radio receiving means having amplifying means, detector means and power actuated means for repetitively scanning the frequency spectrum between prescribed limits for incoming signals, switching means for controlling the power actuated means, relay means operating the switching means, and separate means for biasing the amplifying means to different degrees of sensitivity each connected in a separate circuit with the switching means to be alternately included dependent upon switch position so that the sensitivity of the amplifier will be different for the different switch position, said biasing means including a plurality of resistors, one of which is adjustable.

11. In radio receiving means having amplifying means, detector means and power actuated means for repetitively scanning the frequency spectrum between prescribed limits for incoming signals, switching means for controlling the power actuated means, relay means operating the switching means, a plurality of conductive paths from the amplifier means to the switching means to be alternately included in the circuit by the action of the switching means and resistance means of different values in the paths to each determine the sensitivity of the amplifier and to thus change the sensitivity of the amplifier for the different switch positions.

12. In radio receiving means having amplifying means, detector means and power actuated means for repetitively scanning the frequency spectrum between prescribed limits for incoming signals, switching means for controlling the power actuated means, relay means operating the switching means, a plurality of conductive paths from the amplifier means to the switching means to be alternately included in the circuit by the action of the switching means, resistance means in one of said paths to determine the sensitivity of the amplifier when the tuning means is on station and the relay is deenergized and adjustable resistance means in another path to determine the sensitivity of the amplifier when the relay is energized and the power actuated means is operated.

JAMES H. GUYTON.

References Cited in the file of this patent

UNITED STATES PATENTS

| Number | Name | Date |
|---|---|---|
| 2,182,678 | Root | Dec. 5, 1939 |
| 2,262,218 | Andrews | Nov. 11, 1941 |
| 2,304,871 | Andrews | Dec. 15, 1942 |
| 2,493,741 | Andrews | Jan. 10, 1950 |
| 2,541,018 | Andrews | Feb. 13, 1951 |

FOREIGN PATENTS

| Number | Country | Date |
|---|---|---|
| 812,986 | France | May 21, 1937 |
| 432,427 | Great Britain | July 24, 1935 |
| 493,565 | Great Britain | Oct. 11, 1938 |